United States Patent [19]

Seppelfrick

[11] 4,181,284

[45] Jan. 1, 1980

[54] ANTENNA BRACKET FOR EXTERIOR WALLS

[76] Inventor: Merle N. Seppelfrick, R.R. 1, Harter Rd., Elburn, Ill. 60119

[21] Appl. No.: 914,672

[22] Filed: Jun. 9, 1978

[51] Int. Cl.² ................... A01K 97/10; A45B 25/28
[52] U.S. Cl. ................... 248/514; 248/282; 248/539
[58] Field of Search ............ 248/514, 515, 534, 539, 248/536, 535, 515, 285, 283, 282; 52/110; 343/892, 888

[56] References Cited

U.S. PATENT DOCUMENTS

| 1,554,656 | 9/1925 | Pusey | 248/536 X |
|---|---|---|---|
| 2,495,972 | 1/1950 | Johnson | 248/539 |
| 2,681,195 | 6/1954 | Bradt et al. | 248/536 |
| 2,714,496 | 8/1955 | Doyle | 248/534 X |
| 2,731,223 | 1/1956 | Riccio | 248/539 |
| 2,733,031 | 1/1956 | Morgillo | 248/514 |
| 2,882,080 | 4/1959 | Burns | 248/539 X |
| 2,929,593 | 3/1960 | Rosenwinkel | 248/534 X |
| 3,044,738 | 7/1962 | Kuchera et al. | 248/534 X |
| 3,094,303 | 6/1963 | Belger | 248/514 |
| 3,208,703 | 9/1965 | Arnold et al. | 248/514 |

*Primary Examiner*—J. Franklin Foss
*Attorney, Agent, or Firm*—David C. White

[57] ABSTRACT

An improved antenna bracket for mounting masts for antennas to the exterior wall of buildings having various roof and overhang dimensions. The mounting bracket can be made of parts having standard dimensions and can support an antenna, mast, and rotor, without guy wires or additional support against the roof of the building.

7 Claims, 6 Drawing Figures

ANTENNA BRACKET FOR EXTERIOR WALLS

BACKGROUND OF THE INVENTION

This invention relates to new and useful improvements in a bracket for mounting a mast for antennas on the exterior wall of a building having an overhang, and more particularly to an inexpensive and sturdy bracket that can be mounted and adjusted with maximum ease.

Many antennas for receiving or transmitting electromagnetic radiations for communication purposes, or for home entertainment purposes, require an antenna mounting bracket near or on a building to support an antenna in a vertical or horizontal direction. The antenna is usually supported by a mast and bracket to keep the antenna clear of surrounding objects, and to hold the antenna in a fixed direction. Sometimes a means, such as a rotor, is used to change the direction of the antenna in order to receive or transmit the electromagnetic radiations between more than two fixed points.

Difficulty is encountered in supporting the mast, rotor, and antenna, under varying wind load conditions soley by a mounting bracket attached to the exterior wall of a building. Considerable difficulty is also often encountered in mounting an antenna system on the exterior wall of a building having an overhang, and aligning the mast in a vertical direction. Support of the antenna system on the exterior wall of a building often requires the use of guy wires, or additional support resting on the roof, or attached to the roof. When part of the antenna system is above the roof, corrosion of the members of the system may cause discoloration of the roof. Elements of the antenna system attached to the roof by means of lag screws have been known to cause leaks after a period of time.

SUMMARY OF THE INVENTION

The principal object of the present invention is to obviate the foregoing by providing an improved antenna mounting bracket that can be made of parts having standard dimensions, and can be applied to the exterior wall of buildings having various roof and overhang dimensions.

DESCRIPTION OF THE PREFERRED EMBODIMENT

Figure 1:
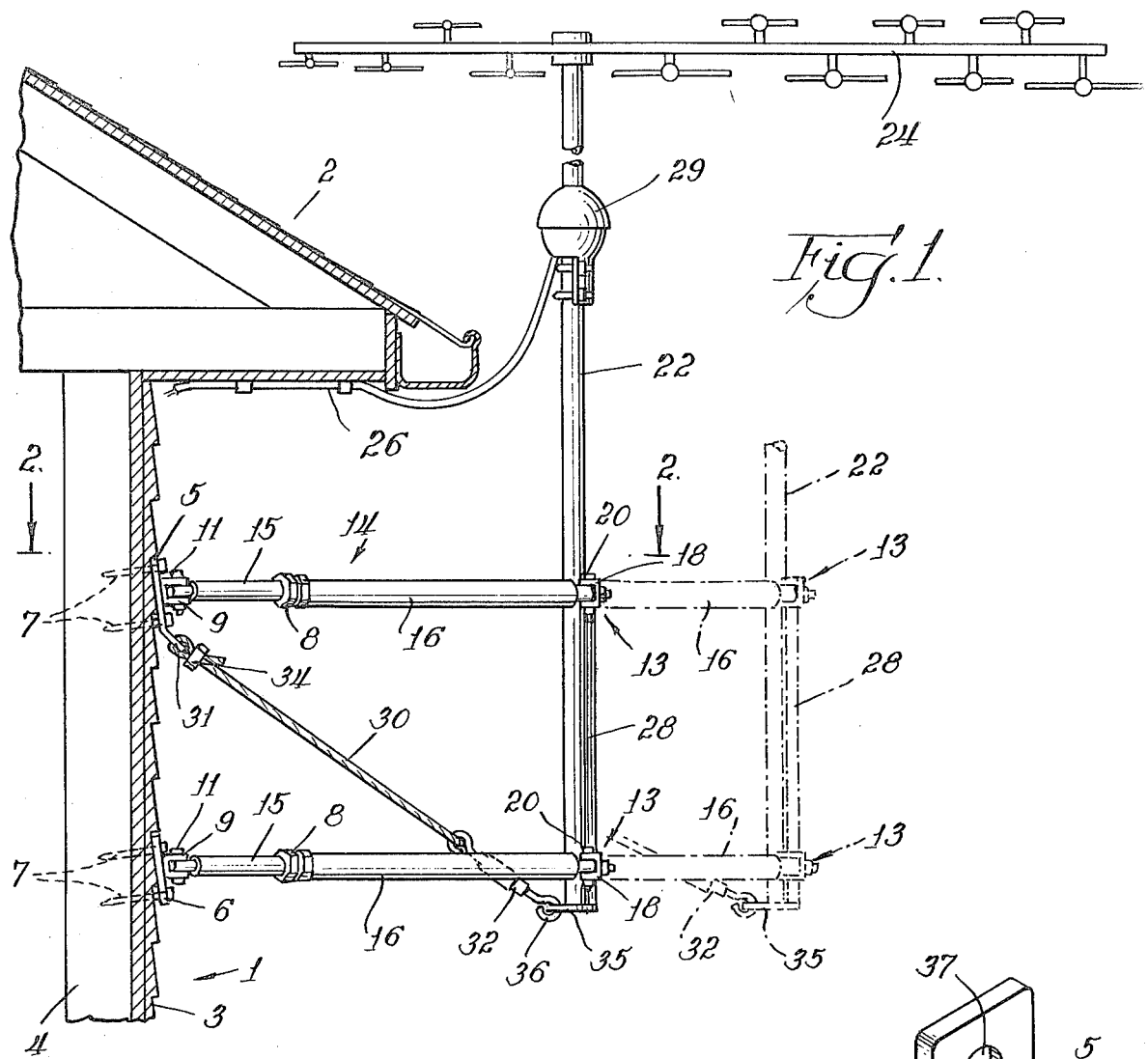
FIG. 1 is a side elevation of an antenna mounting bracket showing a portion of a mast being held in a vertical position by the antenna mounting bracket.
Figure 5:
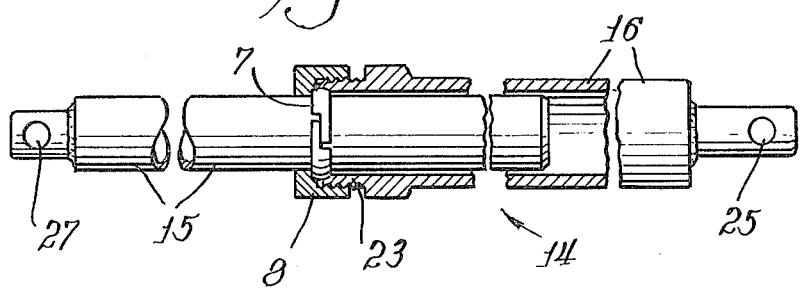
FIG. 5 is a cross-section of an adjustable length arm.
Figure 6:
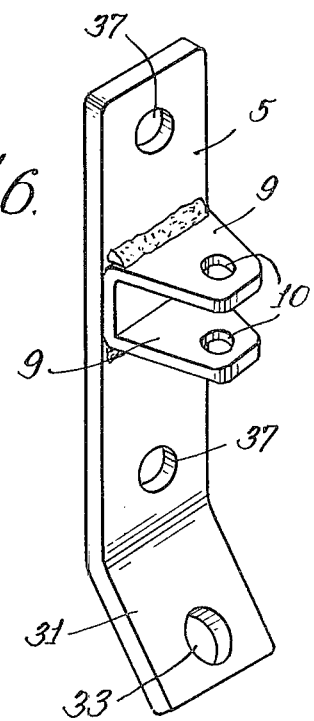
FIG. 6 is an enlarged perspective view of the upper fastening plates.
Figure 2:
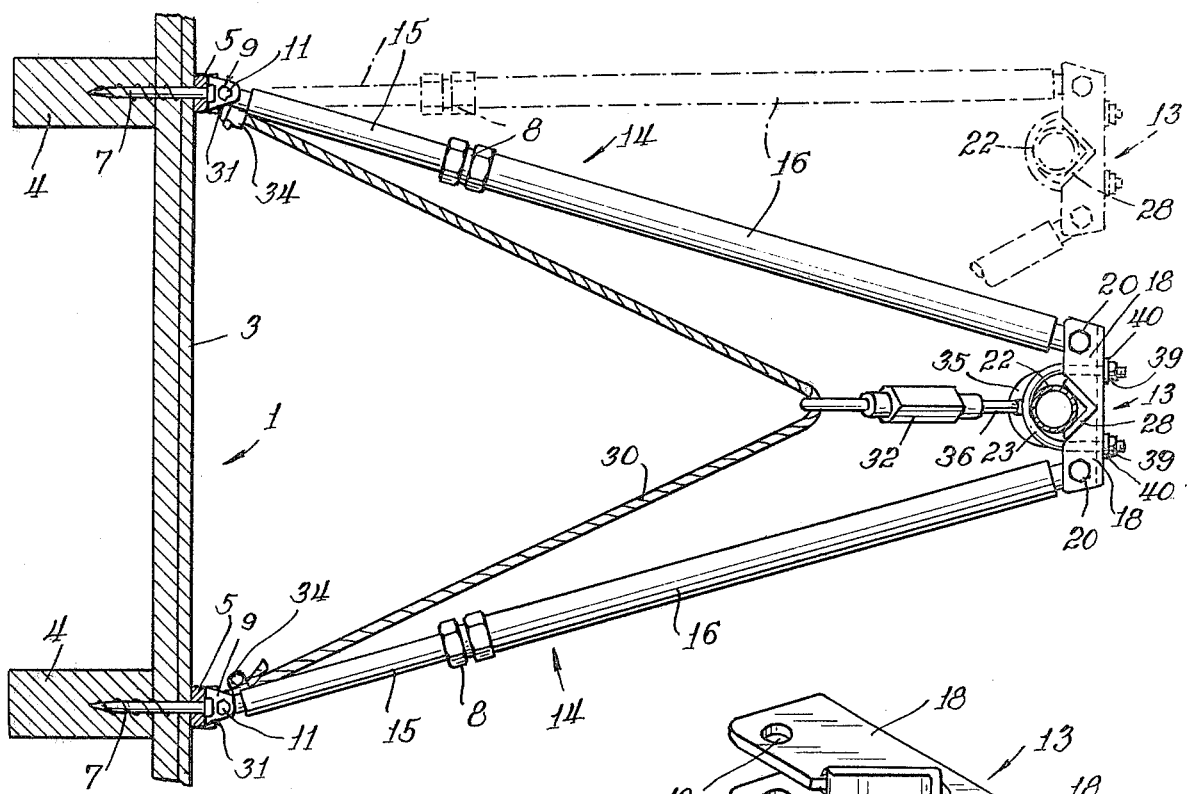
FIG. 2 is a top plan view of a bracket of FIG. 1 as seen from line 2—2.
Figure 4:
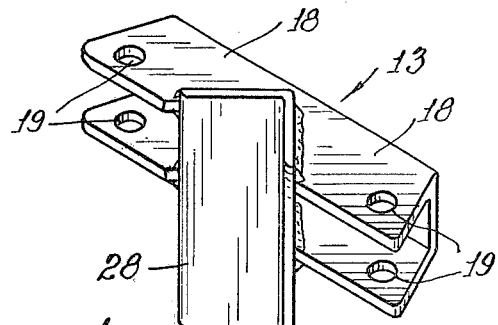
FIG. 4 is an enlarged perspective view of a clamping plate.
Figure 4:
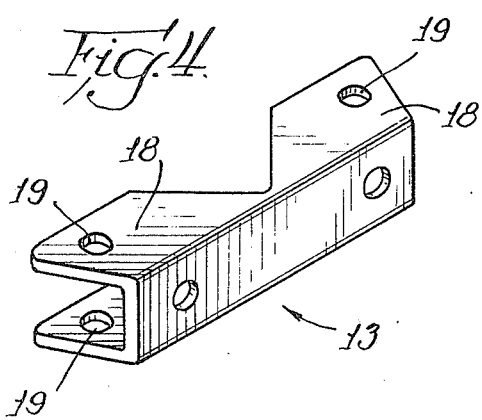
Figure 3:
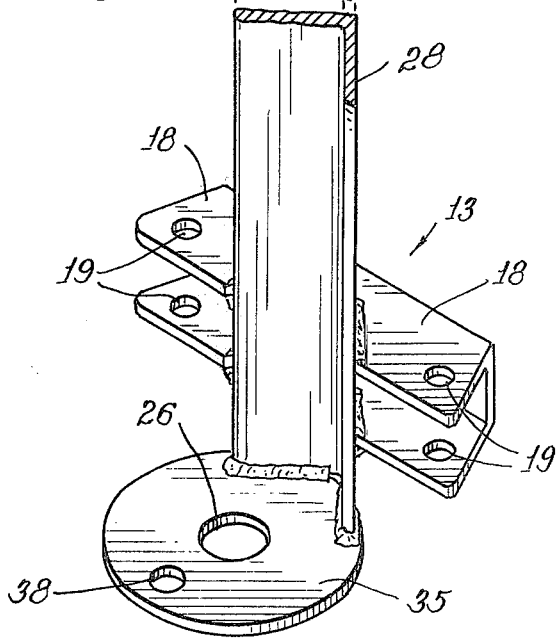
FIG. 3 is an enlarged perspective view of a vertical post.

Referring in detail to the drawings, which illustrate the preferred embodiment of the invention, the numeral 1 represents the side wall of a building covered with siding members 3, having studs 4, and having an inclined roof 2.

My improved antenna mounting bracket is comprised of two rigid upper fastening plates 5, and two lower fastening plates 6, each of which is provided with a plurality of openings 37 adapted to receive screws or like securing means 7 by which the upper fastening plates 5 and lower fastening plates 6 are anchored to the side wall of the building 1. Each of the lower fastening plates 6, and each of the upper fastening plates 5, has a pair of extending, laterally spaced ears 9 which are co-axially apertured as at 10 for receiving a bolt 11 with a self tighening nut 12.

Four adjustable length arms 14 are rotatably connected to the laterally spaced ears 9. The adjustable length arms 14 are each comprised of a pair of rigid telescoping members 15 and 16, and the length of 14 does not change when in a locked position. The locking means consists of a split ring wacher 17 slid between one end of the telescoping member 15 and a threaded end 23 of the telescoping member 16, and a locking nut 8 received by the threaded end 23. The locking nut 8 exerts pressure on the split ring 17 when tightened, locking telescoping members 15 and 16 so that the length of the adjustable length arm 14 does not change. Rigid telescoping member 15 has an aperture 27 transversely thereof for receiving the bolt 11, and the rigid telescoping member 16 has an aperture 25 transversely thereof for receiving a bolt 20. The adjustable length arms 14 are rotatably connected to post 28 made of a standard piece of angle iron. The upper portion of the post 28 has two pairs of extending, laterally spaced ears 18 each coaxially apertured as at 19 for receiving the bolt 20 with a self tighening nut 21. In like manner the lower portion of the post 28 has two pairs of extending laterally spaced ears 18 which are co-axially apertured as at 19 for receiving the bolt 20 with the self tightening nut 21.

One end of a cable 30 is secured to a flange 31 after passing through an aperture 33 in the upper plate 5. The cable 30 passes through one end of a turnbuckle 32, and the opposite end is secured to the other upper plate 5 at flange 31 and is secured by a cable clamp 34. The turnbuckle 32 is fastened to the post 28 by a hooking part 36 received by an opening 38 in a circular butt plate 35. The circular butt plate 35 is an integral part of post 28 and has a drain hole 26.

A mast 22 is mounted to the post 28 by U-bolts 41 within which mast 22 is held by means of suitably shaped clamping plates 13, and nuts 39, and washers 40, on the threaded arms of the U-bolt 41, and rests against the circular butt plate 35.

In the operation of the device the bracket is placed against the exterior wall 1 near the overhang 26 so that the upper fastening plates 5 and lower fastening plates 6 rest against the exterior wall 1. The upper fastening plates 5 and lower fastening plates 6 are secured to the exterior wall 1 by means of lag screws 7 forced into siding members 3 and studs 4. The pair of rigid telescoping members 15 and 16 are adjusted so that the post 28 is positioned to support the mast 22 vertically, and to allow clearance from the overhang 26. Locking nut 8 is tightened to prevent rigid telescoping members 15 and 16 against movement relative to one another. Tension in the cable 30 is readily increased by turnbuckle 32 to prevent the adjustable length arms from moving. The mast 22, antenna rotor 29, and antenna 24, are mounted to the post 28 by means of U-bolts 41 within which mast 22 is held by means of a suitably shaped clamping plate 13, nuts 39, and washers 40, on the threaded arms of the U-bolts 41.

I claim:

1. An antenna supporting bracket adapted for attachment to an exterior wall of a building, the bracket comprising a vertical post, four adjustable length arms, two of the adjustable length arms being rotatably connected to the upper portion of the post and two of the adjustable length arms being rotatably connected to the lower portion of the post, means to lock the adjustable length arms to a fixed length, two substantially flat upper fastening plates having a plurality of apertures spaced longitudinally and transversely thereof rotatably supporting two of the adjustable length arms, two substantially flat lower fastening plates having a plurality of apertures spaced longitudinally and transversely thereof rotatably supporting two of the adjustable length arms, screw means received by the apertures in the upper and the lower fastening plates to secure the antenna supporting bracket to the exterior wall, a flange portion an integral part of the upper fastening plate, a cable fastened at both ends to each of the flanges on the upper plate, means for fastening the cable to the flanges, a turnbuckle by which the center portion of the cable is gripped, means to fasten one end of the turnbuckle to the lower portion of the post, and two clamping plates, one an integral part of the upper portion of the post and the other an integral part of the lower portion of the post for mounting a mast.

2. The antenna supporting bracket as set forth in claim 1, wherein the vertical post comprises an angle iron, a circular butt plate an integral part of the lower end of the angle iron, the two clamping plates, one an integral part of the upper portion of the post and the other an integral part of the lower portion of the post for mounting a mast.

3. The antenna supporting bracket as set forth in claim 1, wherein each of the adjustable length arms comprises a pair of rigid telescoping members, one member being rotatably connected to the fastening plates and the other member being rotatably connected to the post, and means to lock the adjustable length arms to a fixed length.

4. The antenna support bracket as set forth in claim 1, wherein means to fasten one end of the turnbuckle to the lower portion of the post comprises a hook portion an integral part of the turnbuckle received by an aperture in the circular butt plate.

5. The antenna supporting bracket as set forth in claim 1, wherein the locking means comprises two telescoping members, a split ring washer slid between the two telescoping members, a threaded end on one of the telescoping members into which the other telescoping member slides, a lock nut received by the threaded end exerting pressure on the split ring washer when tightened.

6. The antenna supporting bracket as set forth in claim 1, wherein the substantially flat lower fastening plates and the substantially flat upper fastening plates each have a pair of extending, laterally spaced ears which are co-axially apertured to receive a bolt, the adjustable length arms having an aperture transversely thereof for receiving the bolt and the adjustable length arms rotate on the bolt.

7. An antenna supporting bracket adapted for attachment to an exterior wall of a building, the bracket comprising a vertical post, four adjustable length arms, two of the adjustable length arms being rotatably connected to the upper portion of the post and two of the adjustable length arms being rotatably connected to the lower portion of the post, two upper fastening plates rotatably supporting two of the adjustable length arms, two lower fastening plates rotatably supporting two of the adjustable length arms not supported by the upper fastening plates, means to secure the two upper and the two lower fastening plates to the exterior wall of the building, means to keep the four adjustable length arms and the vertical post in a fixed position, means to secure a mast for supporting an antenna to the vertical post.

* * * * *